United States Patent
Kondo (10) Patent No.: US 8,606,005 B2
(45) Date of Patent: Dec. 10, 2013

(54) IMAGE PROCESSING APPARATUS AND IMAGE-PROCESSING METHOD FOR ADJUSTING WHITE BALANCE OF IMAGES

(75) Inventor: Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 99 days.

(21) Appl. No.: 13/298,177

(22) Filed: Nov. 16, 2011

(65) Prior Publication Data

US 2012/0134584 A1 May 31, 2012

(30) Foreign Application Priority Data

Nov. 30, 2010 (JP) .................................. 2010-266165

(51) Int. Cl.
*G06K 9/00* (2006.01)
(52) U.S. Cl.
USPC .......................... 382/167; 348/223.1; 358/516
(58) Field of Classification Search
None
See application file for complete search history.

(56) References Cited

U.S. PATENT DOCUMENTS

| | | | | |
|---|---|---|---|---|
| 7,433,511 | B2 * | 10/2008 | Jacob | 382/167 |
| 2003/0058350 | A1 * | 3/2003 | Ishimaru et al. | 348/223.1 |
| 2005/0041115 | A1 | 2/2005 | Choi | |
| 2005/0052546 | A1 * | 3/2005 | Nakabayashi et al. | 348/223.1 |
| 2005/0128316 | A1 * | 6/2005 | Sugimori | 348/223.1 |
| 2006/0215034 | A1 * | 9/2006 | Nakabayashi et al. | 348/207.99 |
| 2007/0002150 | A1 * | 1/2007 | Abe | 348/223.1 |
| 2007/0127093 | A1 * | 6/2007 | Kuno | 358/516 |

FOREIGN PATENT DOCUMENTS

| | | |
|---|---|---|
| JP | 2004-312366 A | 11/2004 |
| JP | 2005-012763 A | 1/2005 |
| JP | 2006-074691 A | 3/2006 |
| JP | 2008-005540 A | 1/2008 |

OTHER PUBLICATIONS

Suzuki et al. (JP 4496472 B2, machine translation).*
Brewer et al., "Brightness Modification Proposals for Televising Color Film," Proceedings of the IRE (0096-8390), 1954. vol. 42, No. 1; p. 174-191.*
Zhang et al., "Progressive Image Color Neutralization Based on Adaptive Histogram Clustering," Fifth International Conference on Image and Graphics, 2009. ICIG '09. Sep. 20-23, 2009. pp. 113-118.*

* cited by examiner

*Primary Examiner* — Barry Drennan
*Assistant Examiner* — Feng Niu
(74) *Attorney, Agent, or Firm* — Baker Botts L.L.P.

(57) ABSTRACT

In an image processing apparatus, a white balance calculating unit is configured to calculate a first coordinate value that indicates a white balance of an image in a color space. A determining unit is configured to determine whether a first distance between the first coordinate value and a reference coordinate value is greater than a prescribed threshold distance. An adjustment amount setting unit is configured to set the adjustment amount to a first adjustment amount when the determining unit determines that the first distance is smaller than or equal to the prescribed threshold distance, the first adjustment amount corresponding to the first distance, the adjustment amount setting unit setting the adjustment amount to a second adjustment amount when the determining unit determines that the first distance is greater than the prescribed threshold distance, the second adjustment amount corresponding to a second distance smaller than the first distance.

10 Claims, 7 Drawing Sheets

IMAGE PROCESSING APPARATUS AND IMAGE-PROCESSING METHOD FOR ADJUSTING WHITE BALANCE OF IMAGES

CROSS REFERENCE TO RELATED APPLICATION

This application claims priority from Japanese Patent Application No. 2010-266165 filed Nov. 30, 2010. The entire content of this priority application is incorporated herein by reference.

TECHNICAL FIELD

The present invention relates to an image processing apparatus and an image-processing method for adjusting the white balance of an image.

BACKGROUND

Conventional image processing apparatuses have employed a process to correct artificial colors rendered in images so that objects that appear white in person are also rendered white in the image. This process is called white balancing. One technique known in the art adjusts the white balance of an image by analyzing color information in the image to estimate the white point.

SUMMARY

However, the conventional technique of white balancing cannot always estimate an appropriate white point, resulting in overcorrection of the white balance (excessive white balance adjustments). For example, if the conventional method of adjusting white balance described above is used on an image depicting clouds in a blue sky, the conventional image processing apparatus may presume that the white point of the image has an extreme blue cast, resulting in a white balance adjustment that adds a yellow cast to the overall image. Consequently, areas of the image depicting clouds take on a yellowish tint. This is described next in greater detail with reference to FIGS. 1(a) and 1(b).

Figure 1A:
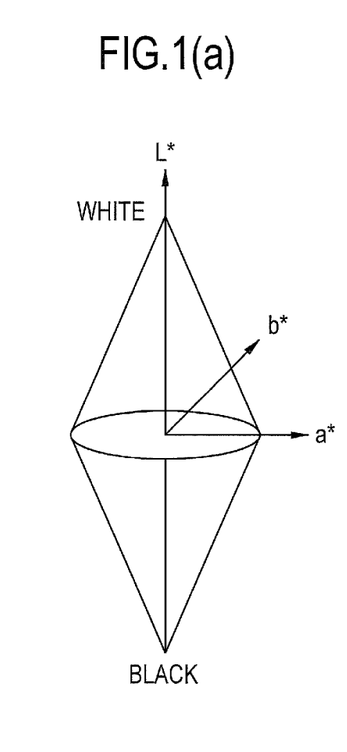
Figure 1B:
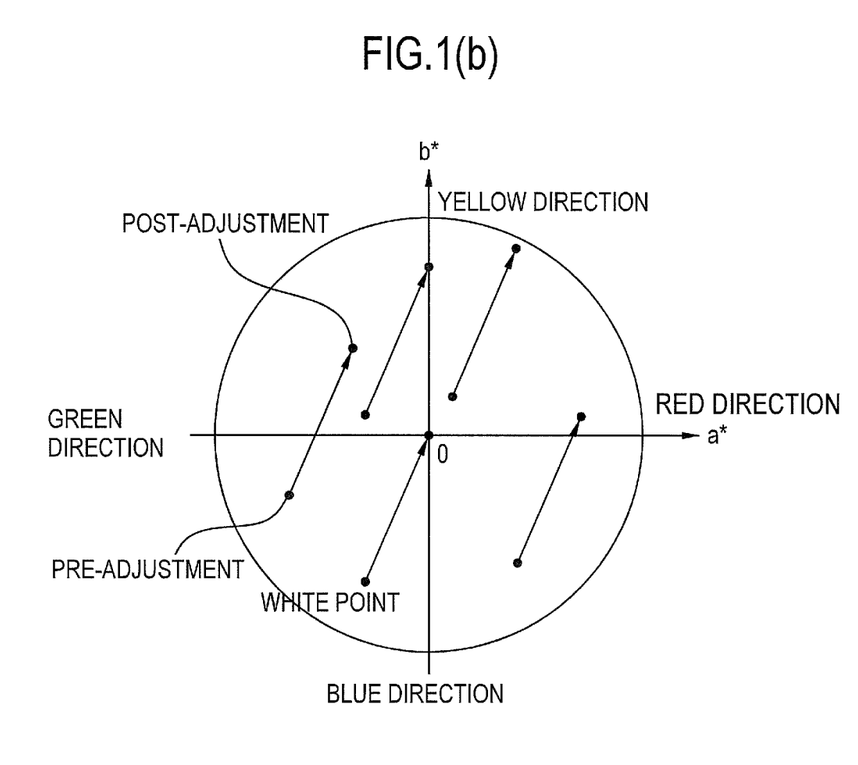

FIG. 1(a) depicts the L*a*b* color space, and FIG. 1(b) is a projection view of the color space of FIG. 1(a) seen from the positive side along the L*-axis. As illustrated in FIG. 1(b), the conventional method recognizes the overall image as having a blue cast when the white point is inferred to be extremely blue. Consequently, when adjusting the white balance so that the estimated white point will be shifted to the point of origin (0,0) indicative of an achromatic color, the a* and b* values for all the pixels in the image are adjusted radically in the yellow direction, and therefore the image is overcorrected in the yellow direction.

Therefore, it is an object of the present invention to provide a technique capable of suppressing overcorrection in white balance adjustments.

In order to attain the above and other objects, the invention provides an image processing apparatus including: a white balance calculating unit; a determining unit; an adjustment amount setting unit; and an adjusting unit. The white balance calculating unit is configured to calculate, based on image data indicative of an image, a first coordinate value that indicates a white balance of the image in a color space, the color space being configured to represent colors in coordinate values. The determining unit is configured to determine whether a first distance between the first coordinate value and a reference coordinate value is greater than a prescribed threshold distance, the reference coordinate value indicating an achromatic color in the color space. The adjustment amount setting unit is configured to set an adjustment amount based on determination results of the determining unit, the adjustment amount setting unit setting the adjustment amount to a first adjustment amount when the determining unit determines that the first distance is smaller than or equal to the prescribed threshold distance, the first adjustment amount corresponding to the first distance, the adjustment amount setting unit setting the adjustment amount to a second adjustment amount when the determining unit determines that the first distance is greater than the prescribed threshold distance, the second adjustment amount corresponding to a second distance which is smaller than the first distance. The adjusting unit is configured to execute a white balance adjustment on the image data using the adjustment amount set by the adjustment amount setting unit.

According to another aspect, the present invention provides a method of processing an image, the method including: calculating, based on image data indicative of an image, a first coordinate value that indicates a white balance of the image in a color space, the color space being configured to represent colors in coordinate values; determining whether a first distance between the first coordinate value and a reference coordinate value is greater than a prescribed threshold distance, the reference coordinate value indicating an achromatic color in the color space; setting an adjustment amount based on determination results, the adjustment amount being set to a first adjustment amount when it is determined that the first distance is smaller than or equal to the prescribed threshold distance, the first adjustment amount corresponding to the first distance, the adjustment amount being set to a second adjustment amount when it is determined that the first distance is greater than the prescribed threshold distance, the second adjustment amount corresponding to a second distance which is smaller than the first distance; and executing a white balance adjustment on the image data using the set adjustment amount.

According to still another aspect, the present invention provides a computer readable storage medium storing a set of program instructions installed on and executed by a computer to process an image, the program instructions including: calculating, based on image data indicative of an image, a first coordinate value that indicates a white balance of the image in a color space, the color space being configured to represent colors in coordinate values; determining whether a first distance between the first coordinate value and a reference coordinate value is greater than a prescribed threshold distance, the reference coordinate value indicating an achromatic color in the color space; setting an adjustment amount based on determination results, the adjustment amount being set to a first adjustment amount when it is determined that the first distance is smaller than or equal to the prescribed threshold distance, the first adjustment amount corresponding to the first distance, the adjustment amount being set to a second adjustment amount when it is determined that the first distance is greater than the prescribed threshold distance, the second adjustment amount corresponding to a second distance which is smaller than the first distance; and executing a white balance adjustment on the image data using the set adjustment amount.

BRIEF DESCRIPTION OF THE DRAWINGS

In the drawings:

FIGS. 1(a) and 1(b) are explanatory diagrams describing a white balance adjustment method of the conventional image processing apparatus, wherein FIG. 1(a) depicts the L*a*b* color space, and FIG. 1(b) is a projection of the color space of FIG. 1(a) seen from the positive side along the L*-axis;

FIGS. 5(a) and 5(b) are explanatory diagrams for describing the reference adjustment amounts, wherein FIG. 5(a) is for a case where a distance Dab of a white balance point (Wa, Wb) from the point of origin (0, 0) is smaller than or equal to a threshold Trad, and FIG. 5(b) is for a case where the distance Dab is greater than the threshold Trad;

DETAILED DESCRIPTION

Next, an embodiment of the present invention will be described while referring to the accompanying drawings.

Structure of a Printer

Figure 2:
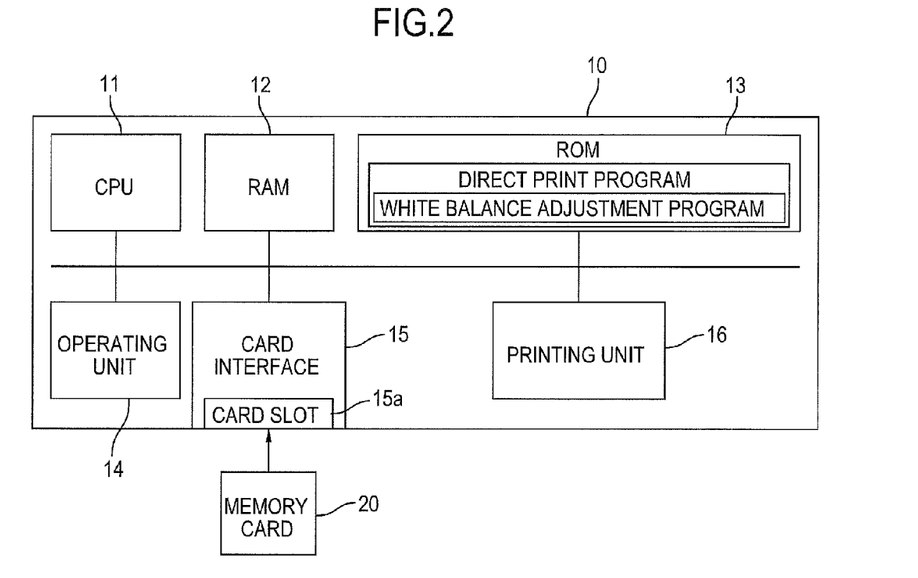
FIG. 2 is a block diagram showing the overall structure of a printer according to an embodiment of the present invention.

FIG. 2 is a block diagram showing the general structure of a printer 10 according to the embodiment. The printer 10 has a function for directly reading image data from a memory card 20 and printing this image data, rather than receiving the image data from a personal computer or other data processor. This function is often referred to as a "direct print function." Here, the memory card 20 is a portable storage medium for storing image data representing images captured by a digital still camera or the like.

As shown in FIG. 2, the hardware configuration of the printer 10 includes a CPU 11, a RAM 12, a ROM 13, an operating unit 14, a card interface 15, and a printing unit 16. The CPU 11 executes processes according to programs stored in the ROM 13 to control all components of the printer 10. The CPU 11 uses the RAM 12 as a temporary work area. The ROM 13 stores various programs, including a direct print program according to which the CPU 11 can execute a direct printing process described later. The direct print program also includes a white balance adjustment program for adjusting the white balance in image data. The operating unit 14 includes a plurality of keys by which the user can perform input operations and inputs signals into the CPU 11 based on the user's input operations. The card interface 15 has a card slot 15a into which the memory card 20 can be directly inserted. In response to a command from the CPU 11, the card interface 15 performs a process to read data stored on the memory card 20 currently inserted in the card slot 15a (image data representing a photographic image, for example). In response to a command from the CPU 11, the printing unit 16 feeds paper one sheet at a time from a paper tray capable of accommodating a plurality of sheets of paper, prints a color image represented by the image data on the paper, and discharges the printed sheet into a discharge unit.

Direct Printing Process

Figure 3:
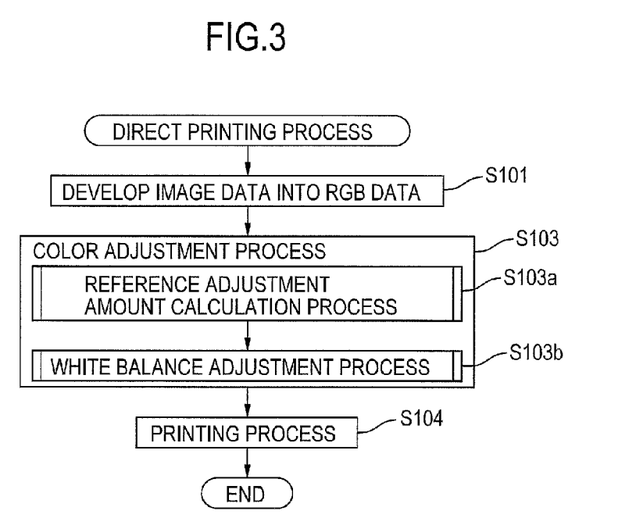
FIG. 3 is a flowchart illustrating steps in a direct printing process executed by the printer shown in FIG. 2.

Next, a direct printing process will be described with reference to the flowchart in FIG. 3. The CPU 11 executes the direct printing process according to the direct print program. The process begins when the user performs a prescribed input operation on the operating unit 14 for executing a direct print to print an image represented by image data stored on the memory card 20.

In S101 at the beginning of the direct printing process, the CPU 11 develops the image data to be printed into RGB data in the RAM 12. More specifically, the CPU 11 reads image data stored on the memory card 20 that has been compressed according to the JPEG format or the like, and develops this data into uncompressed image data with 8 bits for representing each of the RGB values.

In S103 the CPU 11 performs a color adjustment process on the image data to be printed. The color adjustment process includes a reference adjustment amount calculation process S103a and a white balance adjustment process S103b. The process of S103a is performed to calculate reference adjustment amounts to be used when adjusting the white balance of the image data to be printed. The process of S103b is performed to adjust the white balance of the image data. These processes will be described later in greater detail.

In S104 the CPU 11 controls the printing unit 16 to print an image expressed by the image data produced in S103 and subsequently ends the direct printing process.

Reference Adjustment Amount Calculation Process

Next, the reference adjustment amount calculation process in S103a of FIG. 3 will be described with reference to the flowchart in FIG. 4. In this example, the white balance is adjusted using the L*a*b* color space, where L* represents the brightness value and a* and b* represent color values.

In S301 at the beginning of the reference adjustment amount calculation process, the CPU 11 initializes sums Aa and Ab to zero (0). In S302 the CPU 11 initializes a counter Went to zero (0) and advances to S303. The counter Went is used to calculate the white balance of the image, and specifically to count the number of pixels whose color values are accumulated in the sums Aa and Ab.

The subsequent steps S303-S308 are performed to calculate the white balance (Wa, Wb). The white balance (Wa, Wb) indicates offset in the color balance of the image data to be printed. The CPU 11 calculates the white balance (Wa, Wb) by averaging the values a* and b* of all pixels in the image data whose brightness value L* is at least a prescribed value. This process will be described in greater detail below.

In S303 the CPU 11 converts the RGB values (PR(i, j), PG(i, j), PB(i, j)) for a pixel positioned at a coordinate (i, j) in the image data to the L*a*b* values (Pl(i, j), Pa(i, j), Pb(i, j)). In S304 the CPU 11 determines whether the brightness value Pl(i, j) is greater than or equal to a prescribed threshold Th. It is noted that brightness is a value between 0 and 100, and the threshold Th is 90, for example.

If the CPU 11 determines that the brightness value Pl(i, j) is less than the threshold Th (S304: NO), the CPU 11 jumps to S307. However, when the CPU 11 determines that the brightness value Pl(i, j) is greater than or equal to the threshold Th (S304: YES), in S305 the CPU 11 adds Pa(i, j) and Pb(i, j) to the sums Aa and Ab, respectively. In this way, the CPU 11 can add the values a* and b* for all pixels in the image data that have a brightness greater than or equal to the prescribed value (the threshold Th) to the sums Aa and Ab. The values for pixels with a higher brightness are accumulated because these pixels are more susceptible to color offset caused by light sources.

In S306 the CPU 11 increments the counter Wcnt by one, and advances to S307.

In S307 the CPU 11 determines whether all pixels in the image data have been processed. In other words, the CPU 11 determines whether the above process has been performed for all coordinates (i, j) of the image data. When the CPU 11 determines that there remain unprocessed pixels (S307: NO), the CPU 11 repeats the process in S303-S306 described above. When the CPU 11 determines that all pixels have been processed (S307: YES), in S308 the CPU 11 calculates the mean or average a* value "Wa" using the following equation (a) and calculates the mean or average b* value "Wb" using the following equation (b):

$$Wa = Aa/Wcnt \tag{a}$$

$$Wb = Ab/Wcnt \tag{b}$$

Figure 5A:
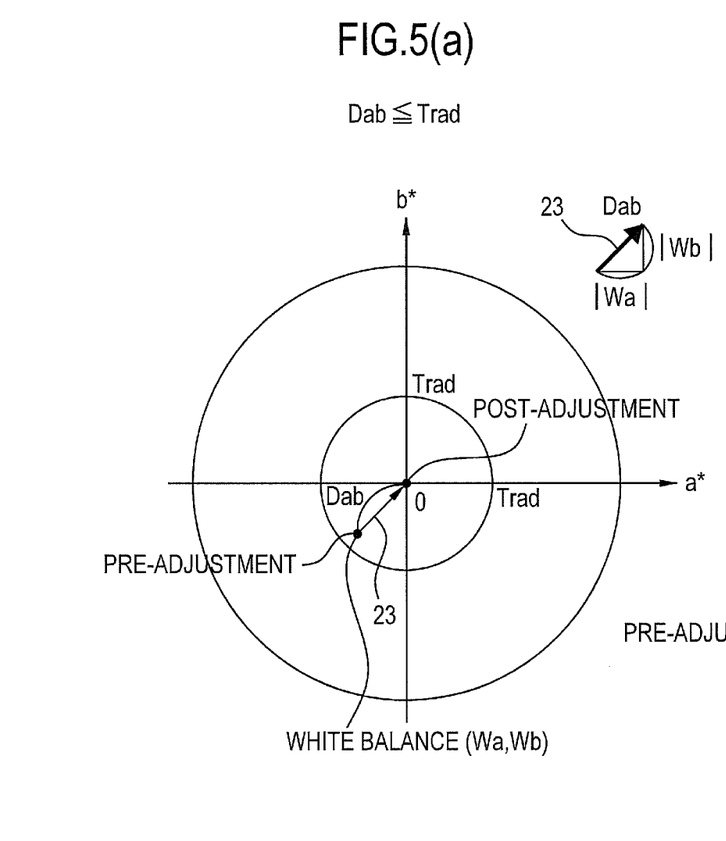
Figure 5B:
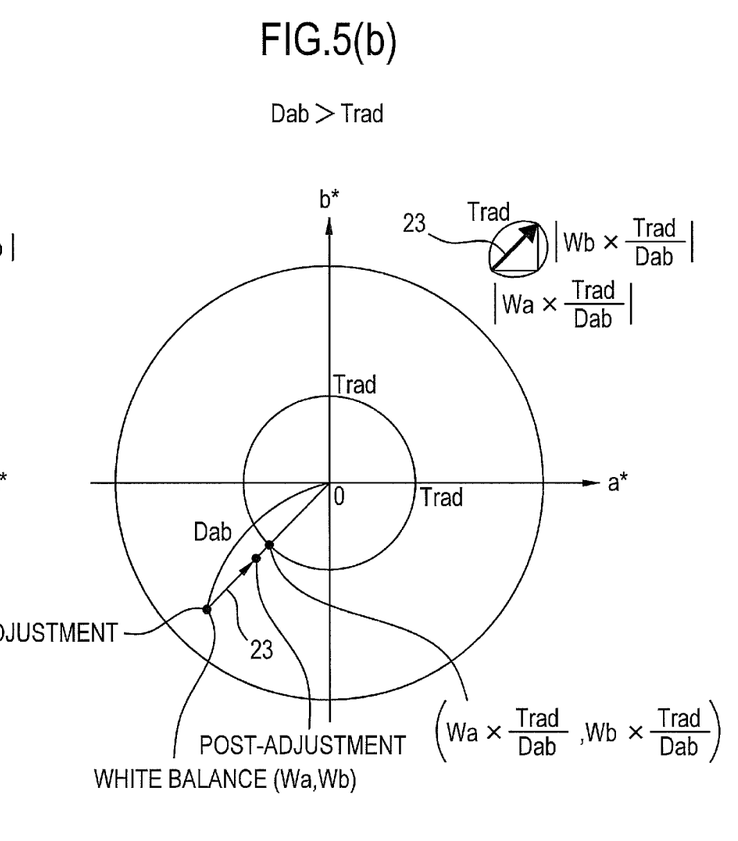

Through this process, the CPU 11 calculates the white balance (Wa, Wb) for the image data to be printed. It is noted that as shown in FIGS. 5(a) and 5(b), the a*b* plane is defined as a projection of the L*a*b* color space seen from the positive side along the L* axis. The white balance (Wa, Wb) is a coordinate value indicative of a color point that is defined in the a*b* plane as being separate from the point of origin (0,0) by the amount Wa in the a* direction and by the amount Wb in the b* direction.

In S309 the CPU 11 calculates a distance Dab from the point of origin (0, 0) to the white balance (Wa, Wb) in the a*b* plane using the following equation (c):

$$Dab = \sqrt{Wa \times Wa + Wb \times Wb} \tag{c}$$

The distance Dab indicates how far the white balance (Wa, Wb) is offset from the point of origin (0, 0) representing an achromatic color, where the achromatic color is a color satisfying the equation (a*, b*)=(0, 0). FIGS. 5(a) and 5(b) show examples of the distance Dab. As shown in FIGS. 5(a) and 5(b), the distance Dab increases in length as the white balance (Wa, Wb) deviates farther from the achromatic color.

In S310 the CPU 11 determines whether the distance Dab is greater than a prescribed threshold Trad. The threshold Trad is a fixed value, such as "5". This determination is executed to determine whether the white balance deviates too much from the achromatic color. If the CPU 11 determines that the distance Dab is less than or equal to the threshold Trad (S310: NO), then in S311 the CPU 11 sets a reference adjustment amount Ba for calculating the white balance adjustment amount in the a* direction (hereinafter simply referred to as an "a*-direction reference adjustment amount Ba") to Wa and a reference adjustment amount Bb for calculating the white balance adjustment amount in the b* direction (hereinafter simply referred to as a "b*-direction reference adjustment amount Bb") to Wb. The a*-direction reference adjustment amount Ba and the b*-direction reference adjustment amount Bb will collectively be referred to as "reference adjustment amounts" hereinafter.

Hence, when the distance Dab is no greater than the threshold Trad, the CPU 11 determines that the white balance (Wa, Wb) is not offset too far from the achromatic color. Thus, the CPU 11 determines that adjusting the white balance by an amount equivalent to the distance Dab in a direction from the white balance (Wa, Wb) toward the point of origin (0,0), that is, correcting the white balance by an amount of (–Wa) in the a* direction and by an amount of –Wb in the b* direction will not result in overcorrection. Hence, the CPU 11 sets the a*-direction reference adjustment amount Ba to Wa and the b*-reference adjustment amount Bb to Wb. In other words, the CPU 11 sets the reference adjustment amounts Ba and Bb based on the white balance coordinate value (Wa, Wb) which is defined in the a*b* plane as shown in FIG. 5(a).

However, when the CPU 11 determines that the distance Dab is greater than the threshold Trad (S310: YES), in S312 the CPU 11 calculates the a* direction reference adjustment amount Ba according to the following equation (d) and calculates the b* direction reference adjustment amount Bb according to the following equation (e):

$$Ba = Wa \times \frac{Trad}{Dab} \tag{d}$$

$$Bb = Wb \times \frac{Trad}{Dab} \tag{e}$$

In other words, when the distance Dab is greater than the threshold Trad, the CPU 11 determines that the white balance (Wa, Wb) deviates too much from the achromatic color. Thus, the CPU 11 determines that adjusting the white balance by an amount equivalent to the distance Dab in the direction from the white balance (Wa, Wb) toward the point of origin (0,0), that is, correcting the white balance by an amount of (–Wa) in the a* direction and by an amount of –Wb in the b* direction would result in overcorrection. Hence, the CPU 11 sets the a* direction reference adjustment amount Ba to a value smaller than Wa (using equation (d)) and sets the b* direction reference adjustment amount Bb to a value smaller than Wb (using equation (e)). In other words, the CPU 11 sets the reference adjustment amounts Ba and Bb based on a coordinate value (Wa×Trad/Dab, Wb×Trad/Dab) which is defined in the a*b* plane. As shown in FIG. 5(b), the coordinate value (Wa×Trad/Dab, Wb×Trad/Dab) indicates a color point in the a*b* plane that is separate from the point of origin (0,0) by the amount "Wa×Trad/Dab" in the a* direction and by the amount "Wb×Trad/Dab" in the b* direction. The color point (Wa×Trad/Dab, Wb×Trad/Dab) is distant from the point of origin (0,0) by the $$\text{distance } Trad \left( = \sqrt{\left(Wa \times \frac{Trad}{Dab}\right)^2 + \left(Wb \times \frac{Trad}{Dab}\right)^2} \right).$$

After calculating the reference adjustment amounts Ba and Bb in S311 or S312, the CPU 11 ends the reference adjustment amount calculation process.

By restricting the reference adjustment amounts in the above-described manner when the distance Dab is greater than the threshold Trad, the CPU 11 can suppress overcorrection when adjusting the white balance of an image.

Specifically, the white balance (Wa, Wb) is calculated as being indicative of an amount by which the overall image data is offset in the a* direction and in the b* direction under the following assumption: If all colors in the overall image data are averaged, resultant values will be equivalent to the achromatic color.

Accordingly, for those images that do not satisfy the above assumption, it is likely that an appropriate white balance cannot be calculated. Hence, when a distance Dab greater than the threshold Trad is calculated based on a calculated white balance (Wa, Wb), there is a possibility that the white balance (Wa, Wb) would be inappropriate and, therefore, white balance adjustment amounts should be restricted.

Next, more detailed descriptions will be given for the reference adjustment amounts Ba and Bb with reference to FIGS. 5(a) and 5(b). FIG. 5(a) is directed to the case where the distance Dab is less than or equal to the threshold Trad, and FIG. 5(b) is directed to the case where the distance Dab is greater than the threshold Trad.

The reference adjustment amounts Ba and Bb are represented by a reference adjustment vector 23 that is defined in the a*b* plane. As shown in FIGS. 5(a) and 5(b), the reference adjustment vector 23 is directed from the white balance (Wa, Wb) in a direction toward the point of origin (0,0), and has a size in the a* direction equal to the absolute value of Ba (|Ba|) and has a size in the b* direction equal to the absolute value of Bb (|Bb|). The reference adjustment vector 23 therefore extends by the magnitude of $\sqrt{Ba^2+Bb^2}$ from the white balance (Wa, Wb) in the direction toward the point of origin (0,0).

More specifically, in the case of FIG. 5(a) where the distance Dab is less than or equal to the threshold Trad, Ba is set as equal to Wa and Bb is set as equal to Wb. So, the reference adjustment vector 23 has a size in the a* direction equal to the absolute value of Wa (|Wa|) and has a size in the b* direction equal to the absolute value of Wb (|Wb|). The reference adjustment vector 23 therefore extends from the white balance point (Wa, Wb) toward the point of origin (0,0) by the magnitude equal to the distance Dab $(=\sqrt{Wa^2+Wb^2})$.

On the other hand, in the case of FIG. 5(b) where the distance Dab is greater than the threshold Trad, Ba is set as equal to (Wa×Trad/Dab) and Bb is set as equal to (Wb×Trad/Dab). So, the reference adjustment vector 23 has a size in the a* direction equal to the absolute value of (Wa×Trad/Dab) (|Wa×Trad/Dab|) and has a size in the b* direction equal to the absolute value of (Wb×Trad/Dab) (|Wb×Trad/Dab|). The reference adjustment vector 23 therefore extends from the white balance point (Wa, Wb) in the direction toward the point of origin (0,0) by the magnitude equal to the $$\text{threshold } Trad\left(=\sqrt{\left(Wa\times\frac{Trad}{Dab}\right)^2+\left(Wb\times\frac{Trad}{Dab}\right)^2}\right).$$

Figure 6:
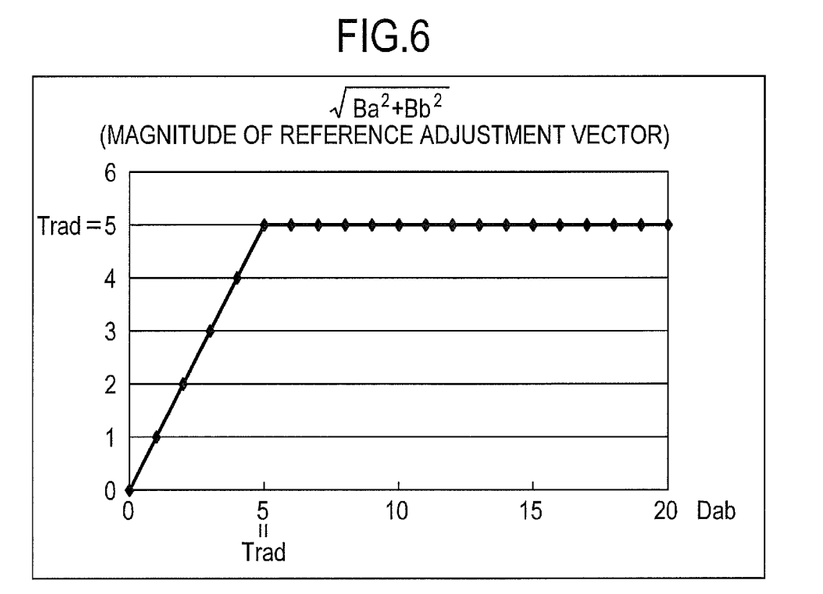
FIG. 6 is an explanatory diagram illustrating the relationship between the distance Dab and the magnitude of a reference adjustment vector.

The relationship between the distance Dab and the magnitude ($\sqrt{Ba^2+Bb^2}$) of the reference adjustment vector 23 is shown in FIG. 6. As apparent from FIG. 6, the magnitude ($\sqrt{Ba^2+Bb^2}$) of the reference adjustment vector 23 increases in proportion to the distance Dab while the distance Dab is within the range of 0 to Trad, and remains fixed at Trad when the distance Dab exceeds the threshold Trad.

White Balance Adjustment Process

Figure 7:
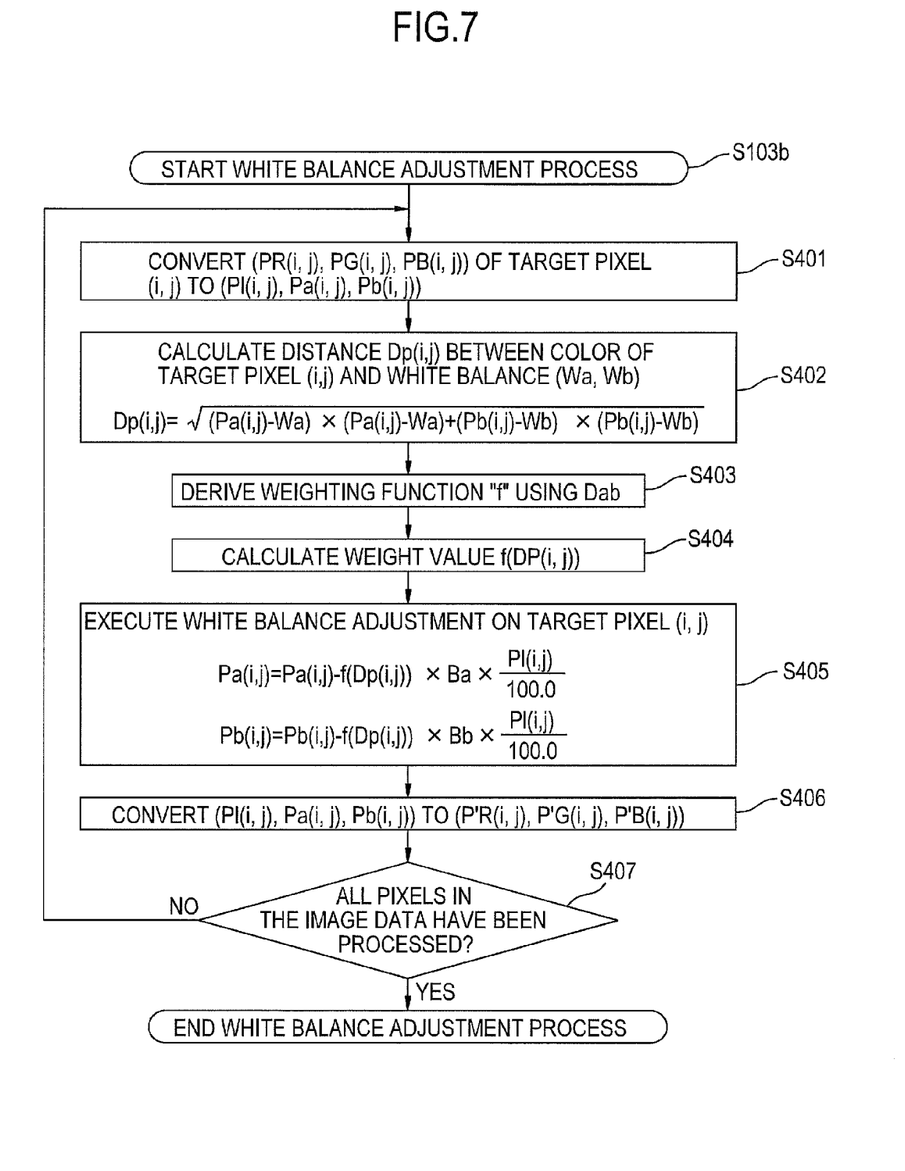
FIG. 7 is a flowchart illustrating steps in a white balance adjustment process in the direct printing process shown in FIG. 3.

Next, the white balance adjustment process in S103b of FIG. 3 will be described with reference to the flowchart in FIG. 7. In S401 at the beginning of the white balance adjustment process, the CPU 11 converts the RGB values (PR(i, j), PG(i, j), PB(i, j)) of a target pixel (i, j) to L*a*b* values (Pl(i, j), Pa(i, j), Pb(i, j)). In S402 the CPU 11 calculates a distance Dp(i, j) for the target pixel (i, j) defined as a distance between the color values (i.e., the a* and b* values) of the target pixel (i, j) and the white balance (Wa, Wb) by using the following equation (f):

$$Dp(i, j) = \sqrt{\begin{aligned}&(Pa(i, j) - Wa)\times(Pa(i, j) - Wa) + \\ &(Pb(i, j) - Wb)\times(Pb(i, j) - Wb)\end{aligned}} \quad (f)$$

The distance Dp increases as the color values for the target pixel move farther away from the color indicated by the white balance.

Figure 8:
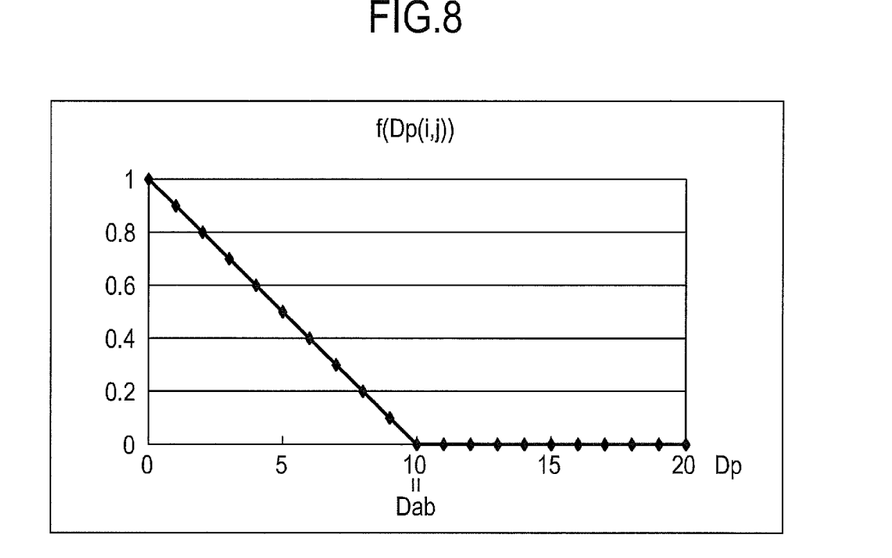
FIG. 8 is an explanatory diagram describing a weighting function f.

In S403 the CPU 11 derives a weighting function f(Dp(i, j)) using the distance Dab. The weighting function "f" is used for calculating a weight to be multiplied by the reference adjustment amounts "Ba" and "Bb" calculated in S311 or S312 of FIG. 4. FIG. 8 is a graph of the weighting function f. As shown in FIG. 8, the value of the weighting function f varies between 0 and 1 based on the inputted value Dp(i, j). Specifically, the weight outputted by the weighting function f is "1" when Dp is "0" and grows smaller as Dp grows larger. The weight outputted by the weighting function f is "0" when Dp reaches Dab and remains fixed at "0" as the Dp grows thereafter.

In S404 the CPU 11 calculates the weight value f(Dp(i, j)) corresponding to the value Dp(i, j) calculated in S402 using the weighting function "f". In S405 the CPU 11 executes a white balance adjustment on the target pixel (i, j). Specifically, the CPU 11 adjusts the a* value Pa(i, j) according to the following equation (g) and adjusts the b* value Pb(i, j) according to the following equation (h):

$$Pa(i, j) = Pa(i, j) - f(Dp(i, j))\times Ba\times\frac{Pl(i, j)}{100.0} \quad (g)$$

$$Pb(i, j) = Pb(i, j) - f(Dp(i, j))\times Bb\times\frac{Pl(i, j)}{100.0} \quad (h)$$

In S406 the CPU 11 converts the L*a*b* values (Pl(i, j), Pa(i, j), Pb(i, j)), whose values Pa(i, j) and Pb(i, j) have been adjusted in S405, to the RGB values (P'R(i, j), P'G(i, j), P'B(i, j)).

In S407 the CPU 11 determines whether the above process has been completed for all pixels in the image. If the CPU 11 determines that there remain unprocessed pixels (S407: NO), the CPU 11 returns to S401 and repeats the process in S401-S406. Once the process has been completed for all pixels in the image (S407: YES), the CPU 11 ends the white balance adjustment process. In this way, the color values a* and b* of each pixel in the image are adjusted, while maintaining unchanged brightness value L* of the each pixel in S405.

Next, equation (g) will be described in greater detail. Equation (h) is similar to equation (g) and, therefore, will not be described here.

In the equation (g), the amount defined by the expression $$"f(Dp(i, j))\times Ba\times\frac{Pl(i, j)}{100.0}"$$

indicates the amount by which the a* value Pa(i, j) of the target pixel (i, j) is adjusted. Similarly, in the equation (h), the amount defined by the expression $$"f(Dp(i, j))\times Bb\times\frac{Pl(i, j)}{100.0}"$$

indicates the amount by which the b* value Pb(i, j) of the target pixel (i, j) is adjusted. Specifically, the reference adjustment amount Ba calculated in S311 or S312 of FIG. 4 is multiplied by the weight f(Dp(i, j)) calculated in S404. Accordingly, as the color of the target pixel (i, j) moves farther away from the white balance (i.e., as Dp(i, j) becomes increasingly larger), the white balance adjustment amount decreases. Further, when the color indicated by the target pixel becomes separated from the white balance by the distance Dab or more, the white balance adjustment amount is set to "0" since the weight f(Dp(i, j)) is "0". In this way, the white balance adjustment amount is less for pixels having colors separated farther from the white balance (Wa, Wb), and the white balance is not adjusted for pixels having colors separated by the distance Dab or more from the white balance (Wa, Wb).

There are those images that inherently do not need a white balance adjustment. Those images are such images that do not satisfy the already-described assumption that if all colors in the overall image data are averaged, resultant values will be equivalent to the achromatic color. Examples of those images include a picked-up image in which a picked-up subject of a specific color exists widely almost over an entire image area, such as an image of a flower of blue color that is picked up by coming close thereto. For those images, white balance is calculated as the specific color due to the influence of color of the picked-up subject, even though those images are not influenced by the color temperature of a light source. For those images, the printer 10 of the embodiment suppresses over-correction in the white balance adjustment, by adjusting the values Ba and Bb to values smaller than the values Wa and Wb in S312 when the distance Dab is greater than the threshold Trad (yes in S310).

Further, there are other images that require a white balance adjustment. Those images are such images that satisfy the above-described assumption and in which color balance of the image data is offset to a specific color due to influence of a light source. It is noted that images can be corrected into naturally-appearing images when colors of higher chroma are corrected by smaller amounts. It is further noted that color nearer to white is more susceptible to light sources. The printer 10 makes the white balance adjustment amounts greater for those colors that are nearer to the white balance, by increasing the amount of the weighting function f(Dp(i, j)) as the target pixel (i, j) moves further closer to the white balance (Wa, Wb). So, the printer 10 executes a proper white balance adjustment on those pixels that are near to the white balance and therefore that are thought to be greatly influenced by the light source.

Thus, the printer 10 can restrict the white balance adjustment amount for images that inherently do not require white balance adjustments, while reducing the influence of the light sources onto images that inherently require a white balance adjustment. In other words, the printer 10 can suitably adjust the white balance for images that require adjustment and images that do not require adjustment.

Figure 4:
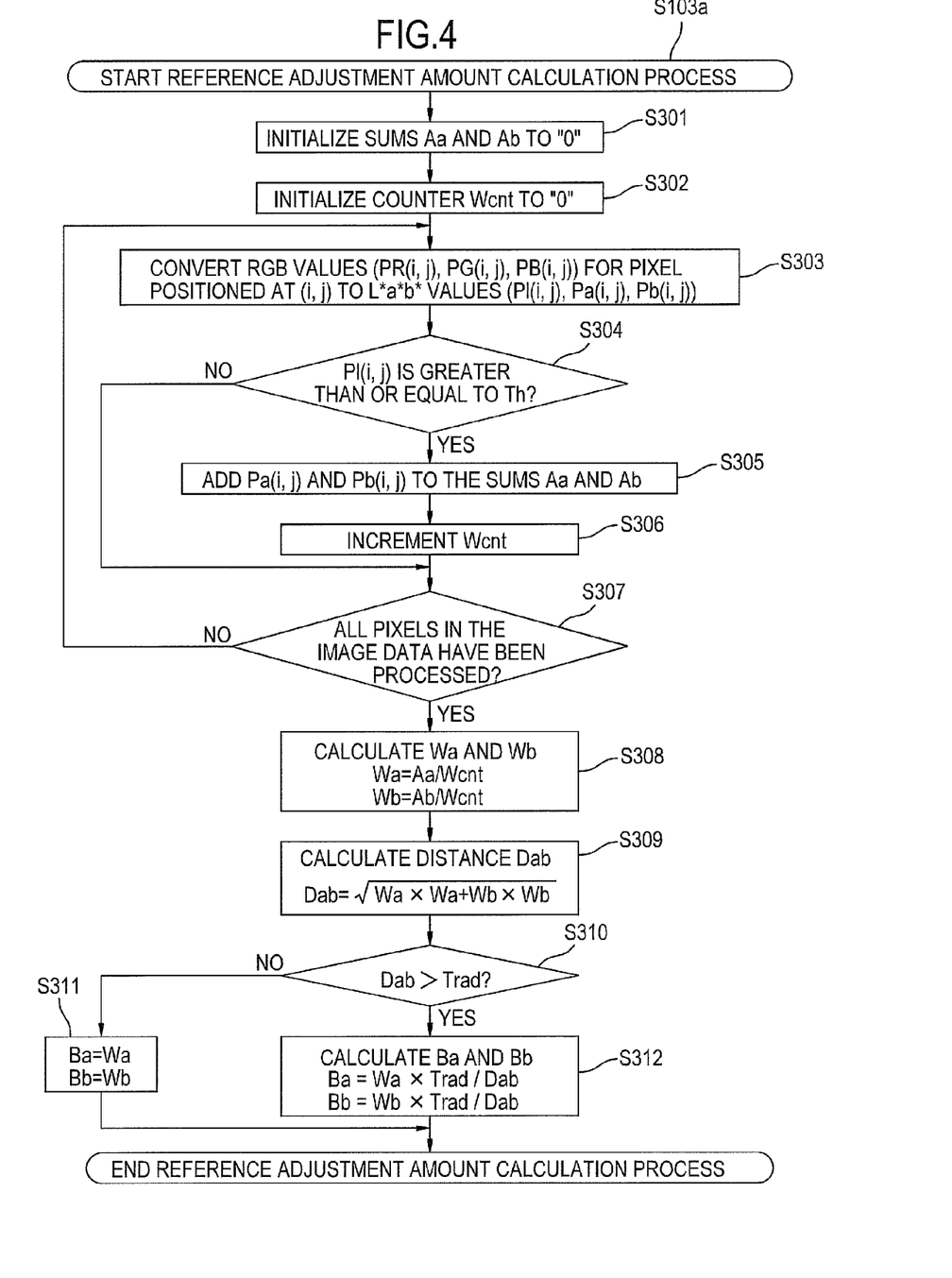
FIG. 4 is a flowchart illustrating steps in a reference adjustment amount calculation process in the direct printing process shown in FIG. 3.

The CPU 11 multiplies the reference adjustment amount Ba calculated in S311 or S312 of FIG. 4 by the percentage of the brightness value P1 (Pl/100) calculated in S401. By increasing the white balance adjustment amount for pixels with a higher brightness in this way, the printer 10 can increase the white balance adjustment amount for pixels thought to be greatly influenced by the light source.

Variations of the Embodiment

While the invention has been described in detail with reference to the specific embodiment thereof, it would be apparent to those skilled in the art that many modifications and variations may be made therein without departing from the spirit of the invention, the scope of which is defined by the attached claims.

For example, in the embodiment, the amounts of white balance adjustment for each pixel are calculated by multiplying the reference adjustment amounts by a weight and a percentage of brightness. However, the adjustment amounts for each pixel may be calculated by multiplying the reference adjustment amounts by only one of the weight and percentage of brightness, rather than both. Or, the adjustment amounts for each pixel may be calculated without multiplying the reference adjustment amounts by the weight or the percentage of brightness. In other words, the adjustment amounts for each pixel may be calculated as being equal to the reference adjustment amounts.

Further, in the embodiment described above, when the distance Dab is greater than the threshold Trad, the reference adjustment amounts Ba and Bb are set to amounts corresponding to the threshold Trad, that is, the amount (Wa×Trad/Dab) in the a* direction and the amount (Wb×Trad/Dab) in the b* direction. However, these amounts Ba and Bb may be set to other amounts corresponding to a distance that is less than the distance Dab and that is other than the threshold Trad.

Further, the threshold Th is preferably greater than or equal to 80 and less than 100, and the threshold Trad is preferably greater than or equal to 3 and less than or equal to 10.

Figure 9:
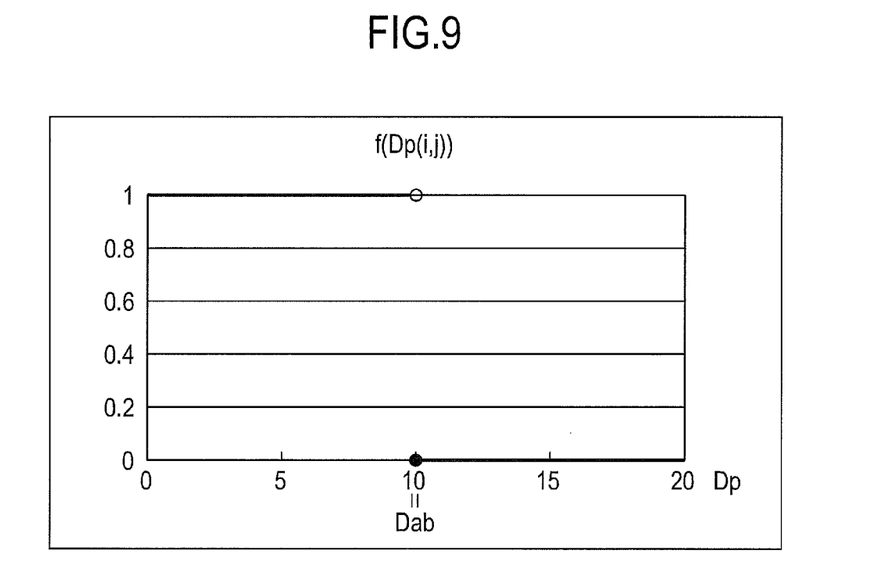
FIG. 9 is an explanatory diagram describing a variation of the weighting function f.

Further, the weighting function f is not limited to the function shown in FIG. 8. For example, the weighting function f may be a function such as that shown in FIG. 9. It is noted that the weighting function f shown in FIG. 8 can suppress overcorrection better than the weighting function f shown in FIG. 9 because the white balance adjustment amount is restricted also for the range of distances Dp greater than or equal to 1 and less than or equal to Dab.

Further, while the present invention is applied to the L*a*b* color space in the embodiment, the present invention may similarly be applied to the YCrCb color space. In this case, the value Cr corresponds to the value a*, the value Cb corresponds to the value b*, and the value Y corresponds to the value L.

A process similar to the process of the embodiment can be performed when reading and printing image data inputted from a personal computer or other data processing apparatus. In other words, the process of the present invention is not limited to direct printing.

Although the embodiment is directed to the configuration, in which the structure for setting the amount of white balance adjustment is incorporated in the printer, the present invention is not limited to this configuration. For example, the structure may be incorporated in another image processing apparatus, such as a copier or facsimile machine. Alternatively, the structure may be incorporated in a digital image capturing device for capturing images and storing the images as digital data, such as a digital still camera or a digital video camera. The structure may also be incorporated in a personal computer or other data processing apparatus. More specifically, a program having content similar to the white balance adjustment program described in the embodiment may be installed on the personal computer and executed thereby. In this case, the program may be originally stored in various types of computer readable storage medium, and may be installed on the computer from the storage medium.

What is claimed is:

1. An image processing apparatus comprising:
   a processor; and
   a memory that stores computer readable instructions that, when executed by the processor, cause the image processing apparatus to implement processes comprising:
   calculating, based on image data indicative of an image, a first coordinate value that indicates a white balance of the image in a color space, the color space being configured to represent colors in coordinate values, the first coordinate value being calculated by averaging color values of particular pixels in the image, each of the particular pixels having a brightness greater than or equal to a particular threshold value;

determining a first distance between the first coordinate value and a reference coordinate value, the reference coordinate value indicating an achromatic color in the color space;

determining, for each pixel in the image, a third distance between the first coordinate value and a third coordinate value corresponding to a color of each pixel;

setting an adjustment amount for each pixel based on the third distance and a first reference adjustment amount when the first distance is less than or equal to the particular threshold distance, the first reference adjustment amount corresponding to the first distance;

setting the adjustment amount for each pixel based on the third distance and a second reference adjustment amount when the first distance is greater than the particular threshold distance, the second reference adjustment amount corresponding to a second distance which is smaller than the first distance; and executing a white balance adjustment for each pixel in the image using the adjustment amount set for each pixel.

2. The image processing apparatus according to claim 1, wherein the first reference adjustment amount is determined based on the first coordinate value, and the second reference adjustment amount is determined based on a second coordinate value whose distance from the reference coordinate value is equal to the second distance.

3. The image processing apparatus according to claim 1, wherein the second distance is equal to the particular threshold distance.

4. The image processing apparatus according to claim 1, wherein the memory stores additional computer readable instructions that, when executed by the processor, cause the image processing apparatus to implement processes further comprising:

setting a weight for each pixel such that a weight for a pixel with a third distance that is greater than or equal to the first distance is smaller than a weight for another pixel with a third distance that is less than the first distance; and setting the adjustment amount for each pixel using the weight set for each pixel.

5. The image processing apparatus according to claim 4, wherein the memory stores additional computer readable instructions that, when executed by the processor, cause the image processing apparatus to implement processes further comprising:

setting the weight for a pixel to a smaller value as the third distance of the pixel increases when the third distance of the pixel is less than the first distance.

6. The image processing apparatus according to claim 4, wherein the memory stores additional computer readable instructions that, when executed by the processor, cause the image processing apparatus to implement:

setting the weight for a pixel to zero (0) when the third distance of the pixel is greater than or equal to the first distance.

7. The image processing apparatus according to claim 4, wherein the memory stores additional computer readable instructions that, when executed by the processor, cause the image processing apparatus to implement:

setting the adjustment amount for each pixel using the brightness of each pixel such that the adjustment amount is set to a larger amount for a pixel having a greater brightness.

8. The image processing apparatus according to claim 1, wherein the memory stores additional computer readable instructions that, when executed by the processor, cause the image processing apparatus to implement:

adjusting a color value for each pixel in the image, while maintaining unchanged the brightness of the each pixel in the image.

9. A method of processing an image, the method comprising:

calculating, based on image data indicative of an image, a first coordinate value that indicates a white balance of the image in a color space, the color space being configured to represent colors in coordinate values, the first coordinate value being calculated by averaging color values of particular pixels in the image, each of the particular pixels having a brightness greater than or equal to a particular threshold value;

determining a first distance between the first coordinate value and a reference coordinate value, the reference coordinate value indicating an achromatic color in the color space;

determining, for each pixel in the image, a third distance between the first coordinate value and a third coordinate value corresponding to a color of each pixel;

setting an adjustment amount for each pixel based on the third distance and a first reference adjustment amount when the first distance is less than or equal to the particular threshold distance, the first reference adjustment amount corresponding to the first distance;

setting the adjustment amount for each pixel based on the third distance and a second reference adjustment amount when the first distance is greater than the particular threshold distance, the second reference adjustment amount corresponding to a second distance which is smaller than the first distance; and executing a white balance adjustment for each pixel in the image using the set-adjustment amount set for the each pixel.

10. A non-transitory computer readable storage medium storing a set of program instructions installed on and executed by a computer to process an image, the program instructions comprising:

calculating, based on image data indicative of an image, a first coordinate value that indicates a white balance of the image in a color space, the color space being configured to represent colors in coordinate values, the first coordinate value being calculated by averaging color values of particular pixels in the image, each of the particular pixels having a brightness greater than or equal to a particular threshold value;

determining a first distance between the first coordinate value and a reference coordinate value, the reference coordinate value indicating an achromatic color in the color space;

determining, for each pixel in the image, a third distance between the first coordinate value and a third coordinate value corresponding to a color of each pixel;

setting an adjustment amount for each pixel based on the third distance and a first reference adjustment amount when the first distance is less than or equal to the particular threshold distance, the first reference adjustment amount corresponding to the first distance;

setting the adjustment amount for each pixel based on the third distance and a second reference adjustment amount when the first distance is greater than the particular threshold distance, the second reference adjustment amount corresponding to a second distance which is smaller than the first distance; and executing a white balance adjustment for each pixel in the image using the adjustment amount set for each pixel.

* * * * *